Sept. 25, 1962 C. C. HAMILTON ETAL 3,055,349

TUBULAR FLUID HEATER AND SUPPORT THEREFOR

Filed May 11, 1959 4 Sheets-Sheet 1

*INVENTORS*
Carl C. Hamilton
*BY* Michael C. Santucci

ATTORNEY

TUBULAR FLUID HEATER AND SUPPORT THEREFOR

Filed May 11, 1959

4 Sheets-Sheet 2

*INVENTORS*
Carl C. Hamilton
*BY* Michael C. Santucci
[signature]
ATTORNEY

TUBULAR FLUID HEATER AND SUPPORT THEREFOR

Filed May 11, 1959 4 Sheets-Sheet 3

INVENTOR.
Carl C. Hamilton
Michael C. Santucci

BY [signature]

ATTORNEY

TUBULAR FLUID HEATER AND SUPPORT THEREFOR

Filed May 11, 1959 4 Sheets-Sheet 4

*INVENTORS*
Carl C. Hamilton
Michael C. Santucci
*BY* [signature]
ATTORNEY 3,055,349
TUBULAR FLUID HEATER AND SUPPORT THEREFOR Carl C. Hamilton, Cuyahoga Falls, and Michael C. Santucci, Barberton, Ohio, assignors to The Babcock & Wilcox Company, New York, N.Y., a corporation of New Jersey Filed May 11, 1959, Ser. No. 812,339
11 Claims. (Cl. 122—510)

This invention relates generally to fluid heaters and more particularly it relates to a novel arrangement and construction of a tubular vapor heater or the like and support therefor for use in a vapor generator.

Heretofore, the known means for supporting horizontal fluid heaters, such as superheaters or economizers formed as platens of nested return bend tubes disposed between opposed upright wall tubes defining a heating chamber of a utility boiler, comprised of a bracket attached to the wall and a lug attached to the horizontal loop. The arrangement was such that the platens were end supported by resting the tube lug on the wall bracket, and any movement due to thermal expansion of the platen was accommodated by a relative sliding movement between the tube lug and wall bracket. Consequently in the design of such supports, suitable clearances or allowances had to be provided for both shop tolerance and thermal expansion; and the combination of these two variables required transfer of load with considerable eccentricity of moment arm as described in paragraph A–72 and FIG. A–12 of the A.S.M.E. 1956 Power Boiler Code.

When the upright wall tubes were spaced on different centers than the transversely spaced platens supported thereon, a bridge casting was positioned on the brackets of adjacent wall tubes to form a shelf therebetween upon which the superheater tube lug rested. However, in either event clearance was always provided between the superheater lug and the face of the wall tubes to allow for differential expansion of the fluid heater with respect to wall movement transversely across the heating chamber. Because of this required spacing between the ends of the fluid heater and the wall of the heating chamber, there resulted excessive laning of the heating gases about the ends of the fluid heater due to the decrease of resistance to gas flow thereat. This enhanced unequal distribution of the heating gases throughout the cross-sectional area of the heating chamber.

In units having a relatively high percentage of entrained solid particles, such as fly ash, in the gas flow, this spacing, which induces laning of the gases, also presents a serious problem of erosion on the tube ends of the fluid heater.

Also when bridge castings were required, the arrangement was such that it was impossible to cool the same by the fluid flow through either the wall support tube or fluid heater supported tube. Consequently these bridge castings were required to be formed of relatively expensive, high heat resistant alloys in order to withstand the high temperature to which they are normally exposed for any practical period of time.

An object of this invention is to overcome the above difficulties by providing a novel fluid heater arrangement and support therefor in which the bracket on the wall tubes and the lug on the return bends of a fluid heater are so joined that no allowance is required therebetween to accommodate for the movement due to thermal expansion.

Another object is to effect a simplification of the hardware required to support a fluid heater on adjacent fluid cooled support tubes defining a heating chamber.

Still another object is to provide a novel fluid heater platen formed of horizontally extending tubes adapted to span a gas pass and a support therefor in which means are provided to form the stiffness required to take a predetermined span for a given or desired maximum deflection at the center of the span.

The foregoing objects and other features and advantages of this invention are attained by end supporting a fluid heater formed of nested return bend tubes having telescoping tube sections, i.e. each fluid heater tube relative to an adjacent nested tube of the fluid heater forms an inner tube segment at one end and an outer tube segment at the other end. The outer tube segment of one tube is fixedly supported relative to an adjacent supporting wall structure while the inner tube segment of another tube nested therein is slidably supported on the outer tube for movement relative thereto. The arrangement offers ample support while permitting the inner tube to expand unrestricted relative to the outer tube. Thus movement due to expansion and contraction is accommodated by a relative sliding action of the inner nested tube relative to the outer tube, and which is herein described as a "trombone effect," rather than by the usual movement of the fluid heater relative to the wall of the chamber.

A feature of this invention resides in the provision that each support attachment is fluid cooled by the flow of fluid through the tube to which it is attached.

Another feature resides in anchoring the end portions of a fluid heater in close proximity to an adjacent supporting wall so as to minimize both the eccentric loading on the end support and the spacing between the ends of the fluid heater and adjacent wall for retarding undesirable gas laning therethrough.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 1:
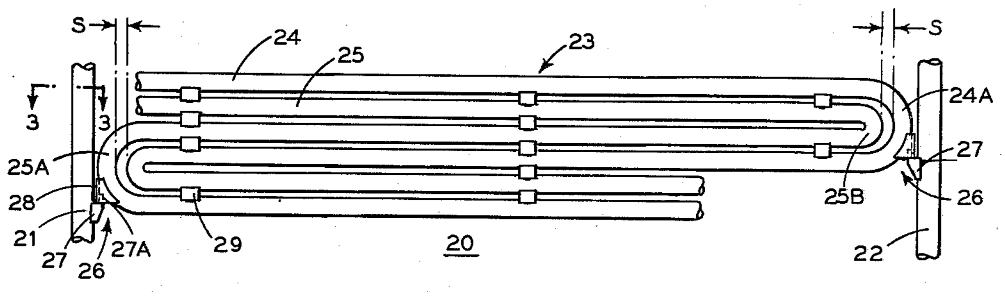
FIG. 1 is a sectional side elevation view taken through a gas pass of a steam generator illustrating a superheater arrangement and support therefor in accordance with this invention.

Referring to FIG. 1 there is illustrated a heating chamber 20, e.g. a birdcage or convection gas pass of a steam generator. The chamber 20 is generally defined by opposed walls of upright fluid cooled support tubes 21 and 22, which for example are connected into the fluid circulating system of the generator.

Figure 3:
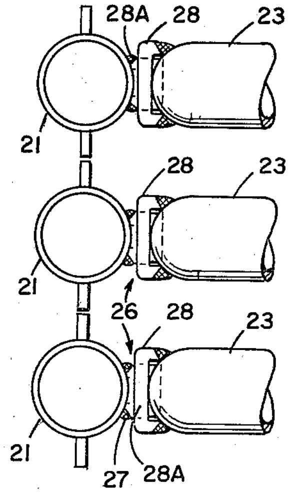
FIG. 3 is a sectional plan view taken along line 3—3 of FIG. 1.

In accordance with this invention there is disposed in the heating chamber 20 a fluid heater 23, e.g. a steam superheater, reheater or economizer. The fluid heater 23 consists essentially of a tubular platen element formed of nested, return bend or multiple looped tubes connected for parallel fluid flow with the loops disposed in a vertical plane. A plurality of such platen elements are generally horizontally spaced across the width of the gas pass or chamber 20 in heat exchange relationship to the heating gas flow therethrough. As shown in FIG. 3, the platens are illustrated as being spaced on the same centers as tubes 21, 22 supporting the same.

As shown in FIG. 1, a platen comprises a pair of nested, co-planar, return bend tubes 24 and 25. Each tube 24, 25 has an oppositely disposed outer return bend portion 24A, 25A at one end thereof, respectively, and oppositely disposed nested inner, return bend portion 24B, 25B at the other end thereof respectively. It will be understood that the frequency or sequence with which the opposed return bends 24A, 24B and 25A, 25B occur, may be repeated as often as required by the particular design consideration of the unit.

Figure 2:
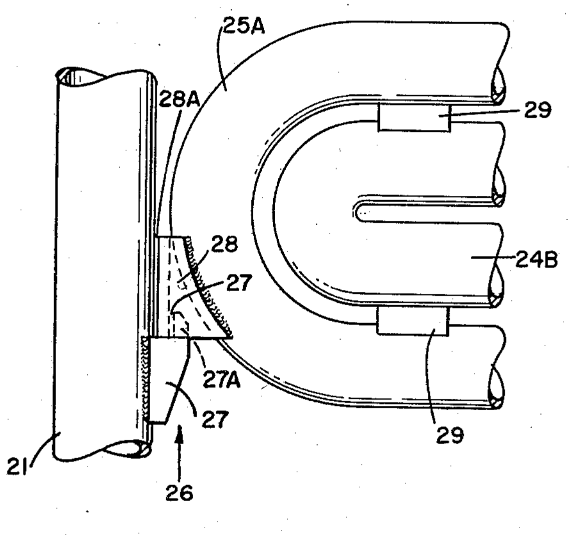
FIG. 2 is an enlarged detail view of the fixed end support illustrated in the arrangement of FIG. 1.

In accordance with this invention, the opposed outermost return bend portions 24A and 25A of tubes 24, 25 respectively, are fixedly supported to the respective adjacent wall tubes 21 and 22. Referring to the enlarged detail, as viewed in FIGS. 2 and 3, the fixed support comprises a hook and eye assembly 26. In the illustrated embodiment the hook portion 27 of the assembly consists of a bracket welded to a support tube, and includes a vertically extending finger portion 27A spaced from the face of the respective support tube 21, 22. The eye element 28 of the assembly consists of a U-shape lug welded to the tube bend, as shown, in which the web portion 28A of the lug is spaced from the respective tube bend 24A, 25A to form the eye. Thus the platen is readily end supported by hooking the lug 28 over the finger 27A of the respective bracket 27 welded to the opposed wall tubes 21, 22. It will be noted that the only clearance, provided for between the bracket 27 and lug 28 described, is the tolerance required to readily position the thickness of the web 28A in the space formed between the face of the wall tube and the edge 27B of the bracket finger 27A.

Figure 4:
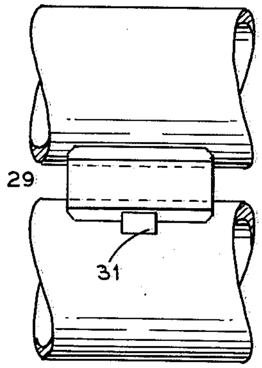
FIG. 4 is an enlarged detail view of the support means slidably supporting the inner nested loop for movement relative to the fixed outer loop.
Figure 5:
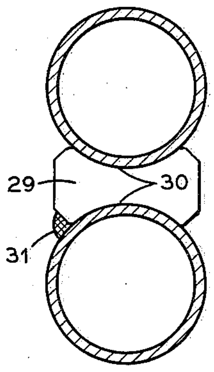
FIG. 5 is an end view of FIG. 4.

The opposed, inner return bend portions 24B, 25B of tubes 24 and 25 respectively, which are nested within the respective outer return bend portion 24A, 25A of the tubes are slidably supported upon the lower tube straight of the outer return bend. As shown in FIGS. 4 and 5, a chair casting 29 is disposed between the tube straights of the nested tubes for spacing and supporting the nested tubes with respect to one another.

In the form illustrated in FIGS. 1 to 5, the chair casting 29 comprises a body having an arcuate tube seat 30 formed in the upper and lower surfaces thereof, each tube seat 30 being formed to conform to substantially the shape of the tube adapted to be received thereby. A tack weld 31 secures the chair casting 29 to the lower tube to prevent relative movement thereof during expansion and contraction. Thus it will be noted that the inner nested loop 24B, 25B is merely rested on the chair and is therefore free to slide thereon during expansion.

With the construction above described it will be noted that the outer looped ends 24A and 25A of tubes 24 and 25, are fixed relative to their respective walls 21 and 22, i.e. anchored thereat, while the inner end portions 24B, 25B of each tube is not anchored and therefore free to slide relative to the fixed tube. Thus heating of the tubes forces expansion to take place toward the unanchored end of each tube by a "telescoping" or sliding movement of the inner loop on the castings 29 provided at the unanchored end. As illustrated in FIG. 1, the space allowed for expansion is indicated by "S," and the relative movement of the unanchored inner loop relative to the fixed outer loop is herein defined as a "trombone effect."

Figure 5C:
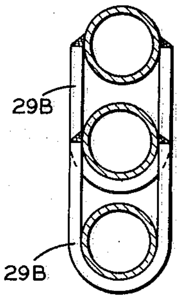
FIG. 5C is an end view of FIG. 5B.
Figure 5B:
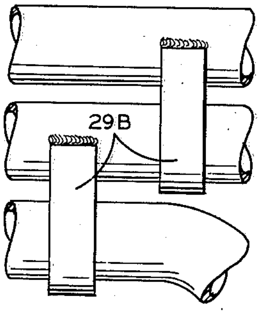
FIG. 5B is an enlarged detail side view of still another modified embodiment of a support means for slidably supporting an inner nested tube relative to a next adjacent outer tube, the embodiment being illustrated in a platen having a triple steam flow path.
Figure 5A:
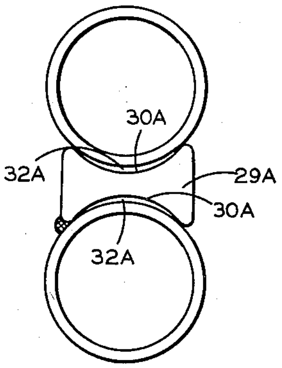
FIG. 5A is an end view similar to that of FIG. 4, but illustrating a modified embodiment of a support means slidably supporting the inner nested loop for movement relative to the outer tube.
Figures 8, 9, 10:
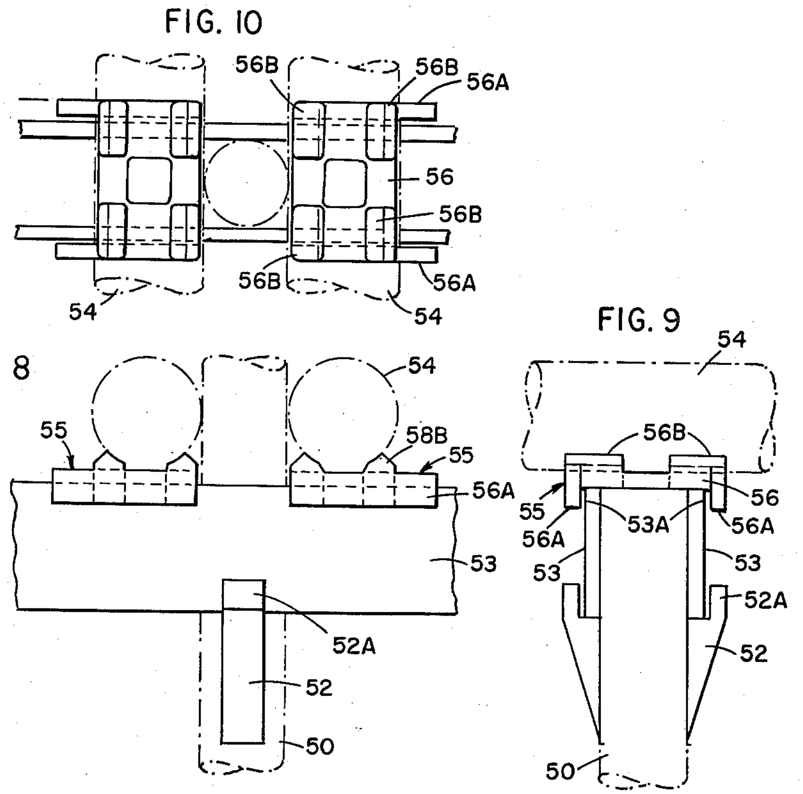
FIG. 8 is an enlarged detail view of the intermediate tube support arrangement of FIG. 7.
FIG. 9 is an end view of FIG. 8.
FIG. 10 is a plan view of FIG. 8.

A modified sliding support 29A is illustrated in FIG. 5A. This form of support is essentially similar to support 29, previously described, with the exception that the arcuate tube seat 30A is formed as an arcuate segment of a circle having a radius which is slightly less than that of the tube received therein. Thus as seen in FIG. 5A, a crescent shaped space 32A is provided between the tubes and the body of support 29A. This construction insures a two point line contact for the tubes received thereby even though the tubes may be slightly out of round. The space 32A also tends to increase the temperature gradient or drop between the respective support and tube. This tends to reduce the stresses in the lug. Also the two line contact between the tube and support 29A enables the entire circumferential wall of the tubes to be at substantially uniform temperatures, thereby minimizing stresses within the tube walls.

Another modified support for the unanchored, nested tube ends is illustrated in FIGS. 5B and 5C. In this form the support 29B consists of U-shaped straps by which an inner tube is supported by the next adjacent superposed nested tube, as shown. In platens having more than two fluid flow paths, as shown in FIGS. 5B and 5C, the straps 29B are arranged so that the load carried by one tube is successively picked up by the next adjacent superposed nested tube.

Figure 11:
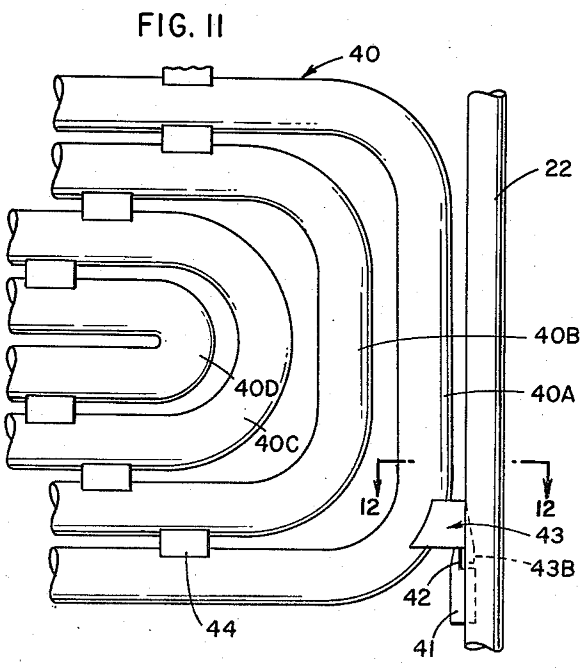
FIG. 11 illustrates a modified embodiment of the invention of the fixed support in an arrangement having a quadruple steam flow path.
Figure 12:
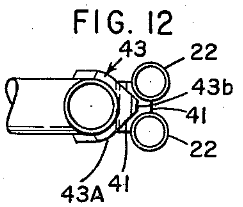
FIG. 12 is a sectional plan view taken along line 12—12 of FIG. 11.

FIGS. 11 and 12 illustrate a modified embodiment of the fixed support assembly. The form herein illustrated is particularly adapted for supporting platen elements 40 which are not in alignment with the wall tube 22 supporting the same. As shown the wall bracket 41 occupies the space between adjacent wall tubes 21 and 22 and it is provided with a finger 42 spaced from the face of the tubes. The platen tube lug 43 comprises a yoke portion 43A welded to the outermost tube loop 40A, the yoke 43A being formed with a depending tail portion 43B. Thus the platen 40 is supported by merely interlocking the tail 43B of the tube lug 43 in the space formed between the face of the tubes 22 and the rear edge of the finger 42. As in the hook and eye assembly 26 previously described, the only clearance required between the co-operating parts 41 and 43 is the tolerance needed to readily position the same together. The supports 44 freely supporting the unanchored nested tube loops 40B, 40C, 40D of platen 40 are constructed like either supports 29 or supports 29A, previously described.

Figure 6:
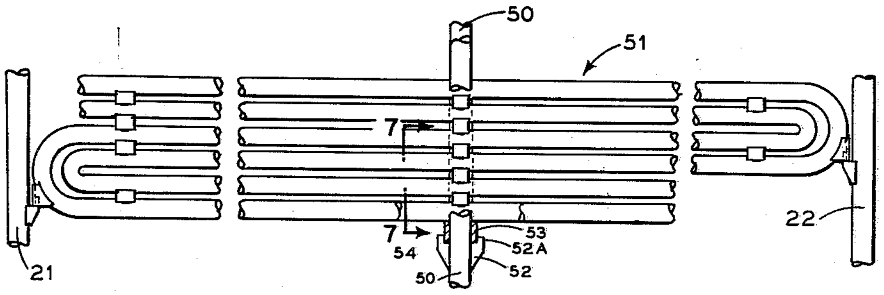
FIG. 6 is a side elevation view of a modified superheater arrangement and a support therefor for accommodating the relatively long span superheater.
Figure 13:
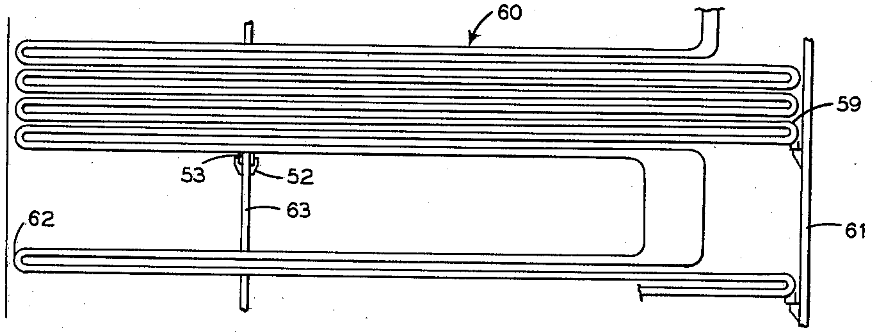
FIG. 13 illustrates still another embodiment for accommodating a long span superheater.
Figure 14:
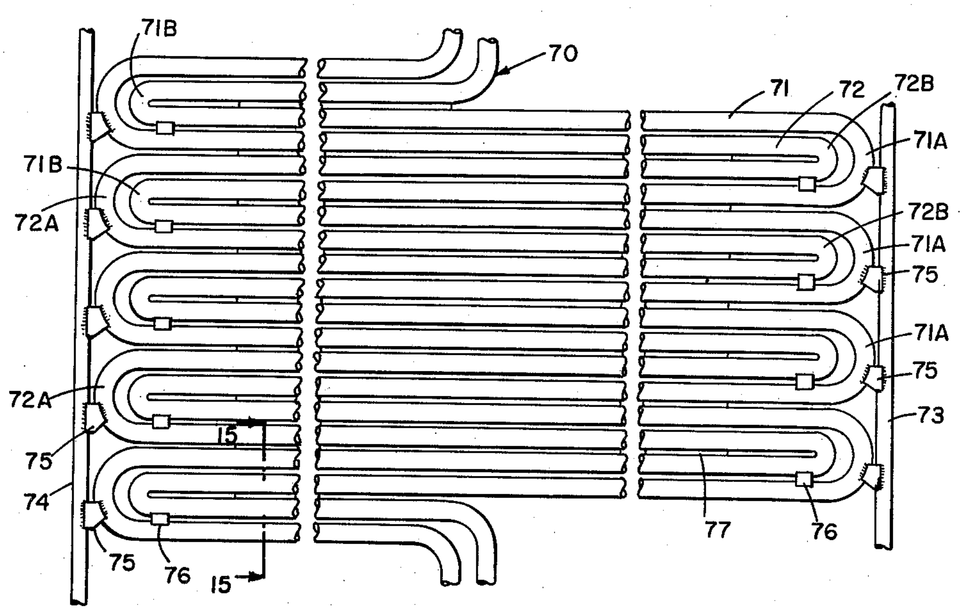
FIG. 14 illustrates still another modified embodiment of a long span superheater and support therefor.
Figure 15:
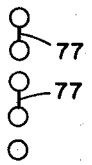
FIG. 15 is a sectional view taken along line 15—15 of FIG. 14.

FIGS. 6, 13 and 14 illustrate the teaching of the present invention as applied to a long span fluid heater, i.e. a fluid heater in which the tubes alone cannot carry the necessary span without exceeding their maximum allowable deflection, which is established as being equal to the inside tube radius.

Figure 7:
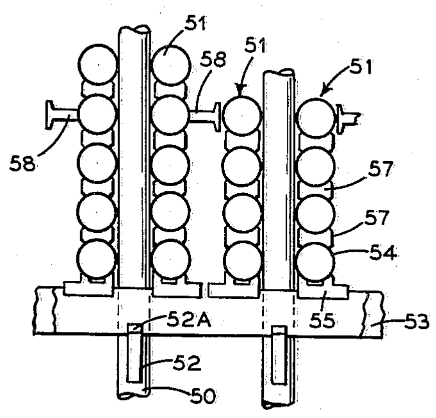
FIG. 7 is a sectional view taken along line 7—7 of FIG. 6.

With reference to the embodiment illustrated by FIG. 6, the platen arrangement is similar to that of FIG. 1, as previously described, with the exception that because of the longer span an intermediate support is required to prevent excessive sagging of the fluid heater tubes. In this form, the intermediate support comprises a row of spaced upright fluid cooled support tubes 50 arranged to extend between adjacent pairs of transversely spaced platen elements 51, as shown in FIG. 7. Like the wall tubes 21, 22, the intermediate support tubes 50 may likewise be connected into the fluid circulation of the unit. Connected to each intermediate support tube 50 on opposite sides thereof in a plane parallel to that of the fluid heater platens 51 are support brackets 52 formed with fingers 52A similar to that of brackets 27 previously described. Extending transversely of the support tubes 50 are a pair of support bars 53 which rest on the aligned brackets 52 in the space formed between finger 52A and the opposed faces of the tubes 51.

Supporting and positioning the lowermost tube straight 54 of each platen 51 on the support bars 53 is a support casting 55. As shown in FIGS. 7 to 10, the support casting 55 consists of a body 56 having depending flange portions 56A which embrace the upper edges 53A of support bars 53. The support flanges 56A overhanging the longitudinal edge of the support bars 53 prevent movement of the support casting 55 relative to the bars 53 during longitudinal expansion of the platen. The upper surface of the support body 56 is provided with rectangularly disposed bosses 56B, suitably contoured for embracing therebetween tube straight 54 extending transversely thereto. As shown in FIG. 7, the succeeding superposed nested tube straights are spaced and supported relative to one another by chair castings 57, which are structurally similar to either castings 29 or 29A as previously described. Lateral spacing between adjacent tube platens 51 is provided by side spacers 58 periodically spaced along the vertical extent of the platens 51.

With reference to FIG. 13, there is diagrammatically illustrated still another embodiment of the invention as it pertains to a long span horizontally extending fluid heater. In this form the outermost loops 59 of platen 60 are fixedly connected to adjacent wall tubes 61 at one end only. The opposite ends 62 of platen 60 are free and are cantileverly supported on a row of spaced upright support tubes 63 in a manner previously described and illustrated by FIGS. 6 and 7. In the form of FIG. 13, the upright support tubes 63 are spaced approximately ⅔ to ¾ of the tube length from the fixed end 59 thereof. The fixed end 59 is secured to the adjacent wall tube in a manner as herebefore described with reference to FIGS. 1 to 5 or FIGS. 11 and 12.

FIG. 14 illustrates still another embodiment of the invention. In this form the platen element 70 includes a pair of nested return bend or multiple looped tubes 71 and 72, in which each tube has an oppositely disposed outer loop and inner loop portion with respect to the other tube thereof, as previously described with reference to FIG. 1. As shown, the outer loop ends 71A and 72A of tubes 71, 72 respectively are fixedly secured to adjacent wall tubes 73, 74, respectively, by a bracket or plate 75 which is welded directly to both the outer loop and the adjacent upright support tube. The inner, nested opposed loops 71B and 72B of tubes 71 and 72 respectively are slidably supported on chair castings 76, which are constructed as previously described with reference to FIGS. 2, 3 or 5C. If desired the fixed support assembly as previously described may be substituted for the directly welded plate member 75.

As illustrated in this form of the invention, means for restricting the deflection or sagging of the horizontal tube span is attained by a web or membrane 77 for obtaining a structural section which in effect forms a good beam for carrying the span. According to the form illustrated, the web or membrane 77 is disposed between tube straights of the same circuit loop. Thus the only temperature pick up is that through each leg, which differential can be taken without overstress due to the membrane 77.

Figure 16:
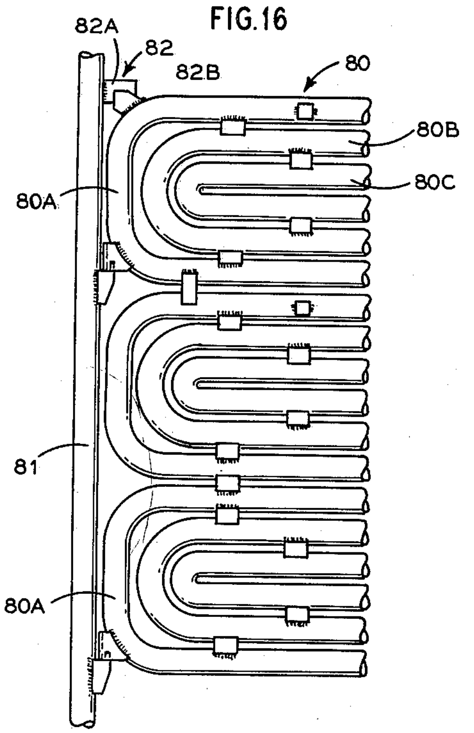
FIG. 16 is an enlarged detail arrangement illustrating a particular end support arrangement of a platen element having a triple parallel steam flow embodying the teachings of this invention.

FIG. 16 illustrates a platen element 80 having a triple fluidflow path in which the outermost loop 80A is fixedly secured to the adjacent upright support tube 81 and the inner loops 80B and 80C supported for relative movement thereto, as herein previously described. Vertical alignment of the platen element 80 is attained by securing the upper end in vertical alignment by means of a welded connectino 82. As shown the connection 82 comprises a pair of welded plates 82A, 82B which are respectively secured to the support tube 81 and the upper outer loop of the platen 80.

In view of the foregoing description it will be noted that several important advantages are attained by the present invention. For example, shop tolerances in the loop lengths need not be closely controlled. Also eccentric loading of the fluid heater end supports is greatly reduced inasmuch as the outermost loop may be brought into closer proximity to the vertical axes of the upright support tubes. Because of the reduced eccentric loading, fewer support points are required for a given length of loop, or conversely longer loops are permitted. Also the erection can be facilitated in that the sections can be pretelescoped to permit easy moving of the same into place.

Another attribute of the present invention is that the use of relatively expensive alloy bridge support castings is eliminated. Theoretically by the utilization of the "trombone effect" herein described, the ends of the outermost loops can be directly welded to the adjacent upright support tubes. The only requirement for attaining this end is that the horizontal convection surface should be arranged in two or more parallel flow paths in order that only one end of each flow path be fixed to an adjacent support tube or wall means.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. In a vapor generator having opposed wall means defining opposed boundaries of a heating chamber, the improvement of a fluid heater disposed in said chamber in heat exchange relationship to a heating gas flowing through said chamber, said fluid heater including a plurality of substantially co-planar horizontally extending, nested tubes forming a platen having vertically disposed opposed return bend portions, one of said nested tubes forming an outer tube bend at one end of the platen and an inner return bend at the other end of said platen, and another tube forming the inner return bend at said one end of the platen and the outer tube bend at said other end of said platen, means for fastening and supporting the outermost return bend of said nested tubes in substantially fixed relationship to one of said wall means so as to inhibit relative movement between the outermost return bend end portion and said wall means, and means for slidably supporting an inner return bend of said nested tubes on the outermost tube so that during expansion and contraction of said tubes, the slidably supported inner tube moves unrestricted relative to the fastened outer return bend tube.

2. In a vapor generator having opposed wall means defining opposed boundaries of a heating cavity, the improvement of a fluid heater disposed in said cavity in heat exchange relationship to a heating gas flowing through said cavity, said fluid heater including a platen element formed of a plurality of substantially co-planar nested tubes having opposed return bend end portions juxtapositioned to said opposed wall means, said platen having an outermost tube and an inner tube, said outermost and inner tubes each having tube straights and a connected outer return bend portion at one end and an inner return bend portion at its other end, and means for supporting an outer end and the inner end portions of each tube whereby the outer end portion of each tube is fastened and supported in substantially fixed relationship with respect to its adjacent wall means so as to prevent relative movement therebetween during expansion and contraction and the inner end portions of each tube being slidably supported relative to the respective outer end portions of the other tube of said pair so that during expansion and contraction of said tubes, the slidably supported inner end portion of each tube moves relative to the respective fastened outer return bend portion of the other tube of said pair.

3. In a vapor generator having opposed wall means defining opposed boundaries of a heating gas pass, the improvement of a fluid heater disposed in said gas pass in heat exchange relationship to a heating gas flowing through said gas pass, said fluid heater including a pair of nested tubes having opposed return bend end portions juxtapositioned to said opposed wall means, each tube of said pair having an outer return bend portion at one end and an inner return bend portion at its other end with respect to the other tube of said pair, and means for supporting the outer and inner end portions of each tube whereby the outer end portion of each tube is fastened and supported relative to its adjacent wall means so as to prevent relative movement therebetween during expansion and contraction and the inner end portions of each tube being slidably supported relative to the respective fastened outer end portions of the other tube of said pair so that during expansion and contraction of said fluid heater the slidably supported inner end portion of each tube moves relative to the respective fastened and supported outer return bend portion of the other tube of said pair.

4. In a vapor generator having opposed rows of upright fluid cooled support tubes defining opposed boundaries of a heating gas pass, the improvement of a fluid heater disposed in said gas pass in heat exchange relationship to a heating gas flowing through said gas pass, said fluid heater including at least a pair of nested tubes forming a platen having opposed return bend end portions juxtapositioned to said opposed rows of support tubes, each tube of said pair having an outer return bend portion at one end and an inner return bend portion at its other end with respect to the other tube of said pair, means for fastening and supporting an opposed outer return bend end portion of each tube of said pair to the adjacent support tube in said boundaries, and means for slidably supporting the inner return bend end portions of each of said tubes of said pair relative to the respective fastened outer return bend end portions of the other tube so that during expansion and contraction of said tubes the slidably supported inner end portion of each tube moves relative to the respective fastened and supported outer return bend portion of the other tube of said pair, said first mentioned support means including a bracket secured to opposed support tubes, said bracket having a hook portion, and a lug attached to the opposed outer return bend portion of said platen, said lug being adapted to receive said hook portion of said brackets with only sufficient clearance to render said hook receivable in said lug and thereby fixedly connect and support said opposed end portion of said platen in relatively immovable relationship with respect to said support tubes during expansion and contraction.

5. In a vapor generator having opposed rows of upright fluid cooled support tubes defining opposed boundaries of a heating gas pass, the improvement of a fluid heater disposed in said gas pass in heat exchange relationship to a heating gas flowing through said gas pass, said fluid heater including at least a pair of nested tubes to form a platen having opposed return bend end portions juxtapositioned to said opposed rows of support tubes, each tube of said pair forming an outer return bend portion at one end and an inner return bend portion at its other end with respect to the other tube of said pair, means for fastening and supporting the outer return bend end portions of each tube of said pair to the adjacent support tube in said opposed tube rows so as to prevent relative movement therebetween due to expansion and contraction, and means for slidably supporting the inner return bend end portions of each of said tubes relative to the respective fastened outer return bend end portions of the other tube forming said pair so that during expansion and contraction of said tubes the slidably supported inner end portion of each tube moves relative to the respective fastened and fixedly supported outer return bend portion of the other tube of said pair, the second mentioned support means including a saddle disposed between said tubes adjacent the inner return end portion of each of said tubes, said saddles each having a seat forming portion for slidably supporting the inner return bend portion of the respective tube.

6. In a vapor generator having opposed wall means defining opposed boundaries of a heating gas pass, the improvement of a fluid heater disposed in said gas pass in heat exchange relationship to a heating gas flowing through said gas pass, said fluid heater including a pair of nested tubes each forming a separate and distinct fluid conducting circuit, said tubes each having opposed return bend end portions juxtapositioned to said opposed wall means, each tube of said pair having tube straights spanning said gas pass and a connected outer return bend portion at one end and a co-planar spaced inner return bend portion at its other end with respect to the other tube of said pair, a web integrally connecting the inner tube straights of the same circuit, said web extended along a substantial length of said tube straights, and means for supporting the outer and inner end portions of each tube whereby the opposed outer end portion of each tube is fixedly supported relative to its adjacent wall means so as to be rendered immovable relative to its adjacent wall means during expansion and contraction and the inner end portions of each tube being slidably supported relative to the respective fixed outer end portions of the other tube of said pair so that during expansion and contraction of said tubes the opposed slidably supported inner end portion of each tube moves relative to the respective fixedly supported outer return bend portion of the other tube of said pair.

7. In a vapor generator having opposed wall means defining opposed boundaries of a heating gas pass, the improvement of a fluid heater disposed in said gas pass in heat exchange relationship to a heating gas flowing through said gas pass, said fluid heater including at least a pair of nested tubes each forming a separate and distinct fluid conducting circuit, said tubes each having opposed return bend end portions juxtapositioned to said opposed wall means, each tube of said pair having tube straights spanning said gas pass and a connected outer return bend portion at one end and a co-planar spaced inner return bend portion at its other end with respect to the other tube of said pair, means for supporting the outer and inner end portions of each tube whereby the outer end portion of each tube is fixedly supported relative to its adjacent wall means whereby the respective outer return bend end portions are rendered relatively immovable with respect to its adjacent wall means during expansion and contraction, and the inner end portions of each tube being slidably supported relative to the respective fixed outer end portions of the other tube of said pair so that during expansion and contraction of said tubes the slidably supported inner end portion of each tube moves relative to the respective fixedly supported outer return bend portion of the other tube of said pair, and means for supporting an intermediate portion of said tube straights spanning said gas pass.

8. The invention as defined in claim 7, wherein said intermediate support means includes a row of spaced upright fluid cooled tubes extending parallel to said opposed wall means, and a support bar connected to and extending transversely of said tube row for supporting an intermediate portion of said fluid heater.

9. In a vapor generator including a gas pass having a wall means and a row of upright fluid cooled support tubes spaced from said wall means, the improvement of a fluid heater disposed in said gas pass in heat exchange relationship to a heating gas flowing through said gas pass, said fluid heater including a pair of nested tubes each forming a separate and distinct fluid conducting circuit, each tube of said pair having parallel tube straights extending across said gas pass, said tube straights being connected by an outer return bend portion at one end and a co-planar spaced inner return bend portion at its other end with respect to the other tube of said pair, the outer return bend portions of one of said tubes being juxtaposed said wall means, means for fixedly supporting the outer return bend end portion of said one tube relative to the adjacent wall means so as to render the outer return bend end portion immovable relative to said juxtaposed wall means during expansion and contraction and the inner end portion of the other tube being slidably supported relative to the respective fixed outer end portions of said one tube so that during expansion and contraction of said tubes, the slidably supported inner end portion of said other tube moves relative to the respective fixedly supported outer return bend portion of said one tube, and means for supporting an intermediate portion of said tube straights on said upright support tubes of said row.

10. In a vapor generator having opposed wall means defining opposed boundaries of a heating chamber, a fluid heater disposed in said chamber in heat exchange relationship to a heating gas flowing through said chamber, said fluid heater including substantially co-planar horizontally extending nested inner and outer tubes traversing said chamber, said nested tubes forming a platen having vertically disposed opposed return bend end portions; the improvement of welded connections for integrally fastening and supporting an outermost return bend end portion of said nested tubes to one of said opposed wall means so as to prevent relative movement therebetween during expansion and contraction of said nested tubes and wall means connected thereto, and means for slidably supporting the inner tube of said nested tubes on the outermost tube so that during expansion and contraction of said nested tubes the slidably supported inner tube moves unrestricted relative to the integrally fastened outer return bend tube fixed to said wall means.

11. In a vapor generator having opposed wall means defining opposed boundaries of a heating chamber, a fluid heater disposed in said chamber in heat exchange relationship to a heating gas flowing through said chamber, said fluid heater including substantially co-planar, horizontally extending inner and outer nested tubes forming a platen having vertically disposed opposed return bend end portions; the improvement of means for fastening and supporting at least one of the outermost return bend end portions of said nested tubes to one of said wall means in substantially fixed relationship thereto so as to inhibit relative movement therebetween during expansion and contraction, and means for slidably supporting an inner return bend end portion of said nested tubes on the outermost tube so that during expansion and contraction of said tubes the slidably supported inner tube moves unrestricted relative to the fastened end of the relative fixed outer return bend tube.

References Cited in the file of this patent

UNITED STATES PATENTS

| | | |
|---|---|---|
| 2,004,895 | Kerr | June 11, 1935 |
| 2,310,801 | Mayo et al. | Feb. 9, 1943 |
| 2,714,877 | Andrew | Aug. 9, 1955 |